United States Patent [19]

Conde et al.

[11] 4,152,605

[45] May 1, 1979

[54] AUTOMATIC LOAD CONTROL SYSTEM AND METHOD FOR A POWER DISTRIBUTION NETWORK

[76] Inventors: Hector O. Conde, 639 Lincoln Ave., Alameda, Calif. 94501; Willard H. Wattenburg, 1167 Grizzly Peak Blvd., Berkeley, Calif. 94708

[21] Appl. No.: 838,471

[22] Filed: Oct. 3, 1977

[51] Int. Cl.² ............................................... H02J 3/00
[52] U.S. Cl. ....................................... 307/3; 307/140; 340/310 A
[58] Field of Search ...................... 307/3, 140, 141, 39, 307/40, 129; 340/310 R, 310 A

[56] References Cited

U.S. PATENT DOCUMENTS

| | | | |
|---|---|---|---|
| 706,575 | 8/1902 | Lunt | 307/3 X |
| 2,206,702 | 7/1940 | La Pierre | 235/52 |
| 2,587,213 | 2/1952 | Polin | 325/31 |
| 3,003,122 | 10/1961 | Gerhard | 307/253 X |
| 3,283,316 | 11/1966 | Beardmore et al. | 340/310 |
| 3,460,121 | 8/1969 | Wattenburg | 340/216 |
| 3,903,508 | 9/1975 | Taketa | 340/310 R |
| 4,027,171 | 5/1977 | Browder et al. | 307/117 X |

Primary Examiner—J. V. Truhe
Assistant Examiner—Morris Ginsburg
Attorney, Agent, or Firm—Robert B. Block

[57] ABSTRACT

A system and method for regulating power demand in a power distribution system by means of time-of-day metering or remote control of energy-consuming appliances. The system provides means for producing control signals which can be reliably sent to numerous customers over a power distribution system from a central location. Means located at each electric power meter or controlled appliance monitors the signal on the power line to detect an incoming control signal. When a signal reaches the customer, a switch is operated either changing the metering rate or controlling the electricity supply to an appliance. Steps in the preferred method include modulating the line frequency by means of at least one signal frequency. The incoming power signal is continuously monitored at the customer load or meter and any control signals detected serve to actuate a load control switch or the like.

18 Claims, 6 Drawing Figures

AUTOMATIC LOAD CONTROL SYSTEM AND METHOD FOR A POWER DISTRIBUTION NETWORK

BACKGROUND OF THE INVENTION

This invention relates to a signalling and communication system for transmitting signals over active power lines for the purpose of regulating power demand.

The demand for power experienced by power companies varies throughout each twenty-four hour period. To assure an adequate power supply at all times generating capacity must be maintained or alternative supplies made available to handle the peak demand. Generally, this results in unused generating capacity during off-peak hours.

Methods under study to reduce the diurnal variations in electric power demand include time-of-day metering and remote control of specific customer appliances. The former system varies the cost of electricity over the course of a day to encourage customers to reduce consumption during peak demand and increase demand when excess supply is available. The latter method permits the power company to switch off various large power-consuming appliances such as electric water heaters or air conditioners. This will permit the power company to directly reduce its load during peak periods.

To be economically feasible a load control system in a power distribution network supplying numerous households and small businesses must permit remote control at the end user points from a central location such as a power house or substation. It would be prohibitively expensive to use a signal transmission system different from the power lines themselves. But if the power lines are employed to carry remote control signals, the system must be made unresponsive to ordinary noise encountered on such lines. Otherwise the system might inadvertently cut off or overcharged.

OBJECTS AND SUMMARY OF THE INVENTION

It is an object of the invention to provide a power line signalling system for remotely controlling power demand at plurality of customer loads.

Another object of the invention is to provide such a signalling system in which control signals are transmitted over the active power lines supplying power to customers.

Another object of the invention is to provide such a signalling system which will prevent the inadvertent cutting off or overcharging of customers.

Accordingly, a signalling system for transmitting power at a line frequency is provided with a switch located at each customer load to regulate power demand. Signalling means introduce selectively at least one control signal onto the power line in the power distribution system. The signalling means includes oscillating means for producing at least one signal frequency and modulating means for modulating the signal frequency at a modulation frequency thereby producing at least one of the control signals. Receiving means adjacent the customer load monitor the incoming signal on the power line to detect control signals which have been introduced thereon. The receiving means include a first filter circuit having at least one first filter which passes a signal frequency produced by the oscillation means and a second filter tuned to the modulation frequency. The receiving means is connected to the power line and is set to operate the first switch means in response to control signals introduced selectively by said signalling means. Steps in the preferred method include generating at least one oscillating signal having a predetermined signal frequency, modulating each signal generated at a modulation frequency to form a control signal, and selectively introducing at least one control signal formed onto the power line. The signal on the power line is continuously monitored using the monitoring means to filter the signal on the power line and detect the control signals introduced thereon. The first switch means is operated in response to the control signals detected to thereby regulate power demand.

DESCRIPTION OF THE PREFERRED EMBODIMENTS

The apparatus of the invention generally comprises a transmitter connected in a power distribution network at a central distribution point, and a plurality of receiving units each at a designated customer. The receiving units each operate a switch which either directly controls the power to a specific load or adjusts the cost of the power. In essence, the invention permits remote control of a load control switch from a centrally located transmitter.

Figure 1:
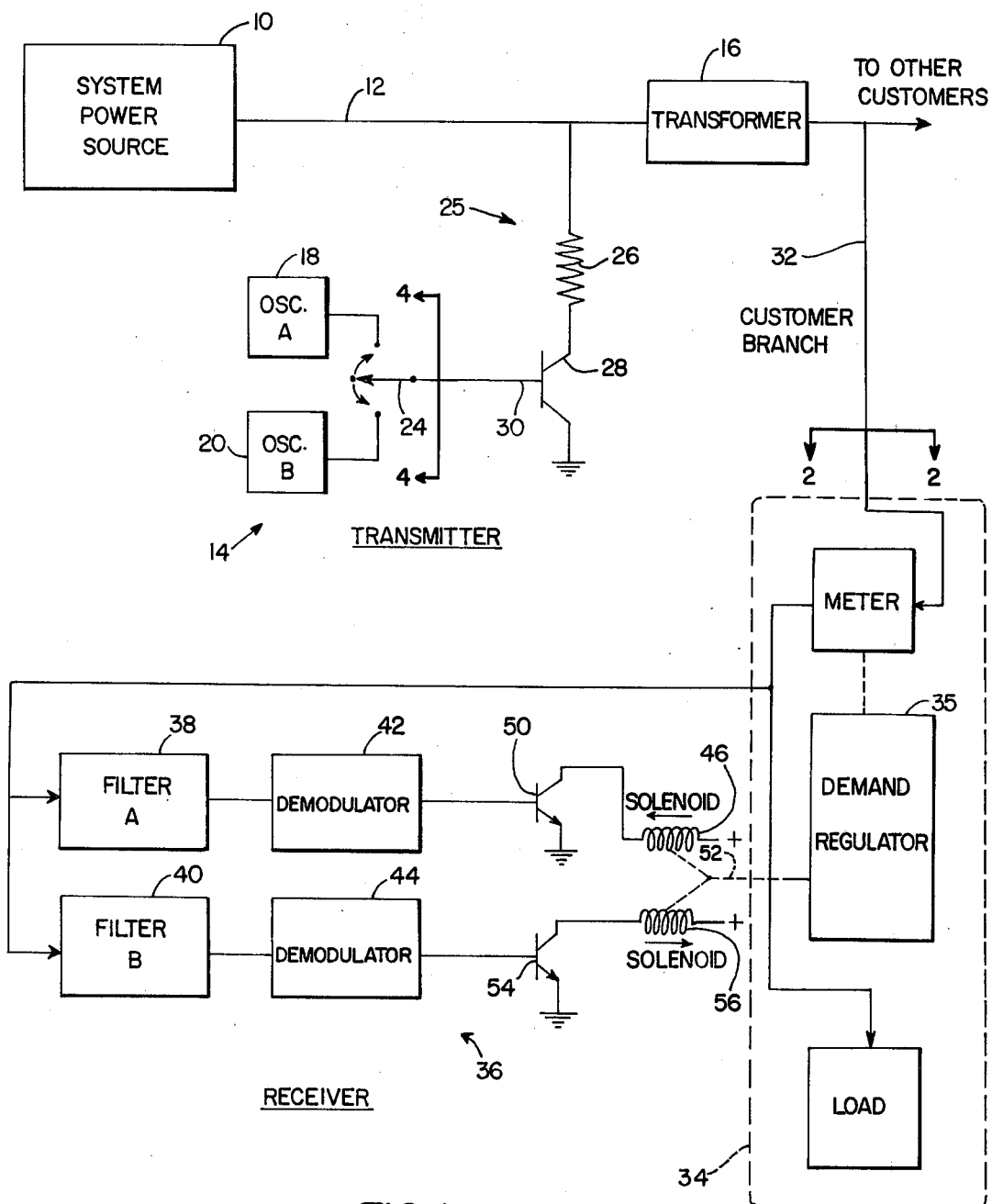
FIG. 1 is a schematic illustration of an automatic load control system of the invention as applied to a power distribution network.

Referring to FIG. 1 a power system is illustrated schematically with the system power source 10 representing the system supply from a generation plant or the like. Power line 12 represents a primary branch line from a distribution feeder network supplied by source 10. Power line 12 supplies a plurality of individual customers. The transmitter generally indicated at 14 is connected to line 12 at an appropriate point such as a substation. Transformer 16 reduces the voltage to the standard 120–140 volt power which is supplied to most individual customers. A plurality of such transformers are generally located along a distribution line.

Transmitter 14 includes oscillating means for supplying two different oscillating signals and means for selectively introducing the signals onto power line 12. A Oscillator 18 and B Oscillator 20 provide signals at two different predetermined signal frequencies. In the preferred embodiment, A Oscillator 18 operates at 18 KHz and B Oscillator 20 operates at 21 KHz. Oscillators 18 and 20 are conventional multivibrator circuits such as Motorola's MC4024 voltage-controlled multivibrator. Switch 24 provides means for selectively introducing either the 18 KHz or 21 KHz signal frequencies onto power line 12 by way of load modulator circuit 25.

Load modulator 25 comprises a load 26 and a second switch means in the form of transistor 28. In response to an oscillating signal supplied to base 30 via switch 24, transistor 28 periodically connects impedance 26 to power line 12, thereby modulating the power line at one of the two signal frequencies to be introduced.

Line 12 carries a power signal of 60 Hz. Variations in the load affect the amplitude of the power signal. When a high frequency periodic load is introduced onto the power line by way of load modulator 25, a small high-frequency amplitude modulation is introduced into the power signal. As the 60 Hz power signal passes through its zero points, the signal introduced by load modulator 25 also drops to zero. The 18 KHz and 21 KHz signal frequencies are thus effectively modulated at a modulation frequency of 60 Hz as the signals are selectively introduced onto power line 12. The two 60 Hz modulated signal frequencies form two control signals.

When a control signal is introduced onto power line 12 by transmitter 14, it is carried by the distribution network to each customer supplied by the power line. Branch line 32 is a representative customer branch line supplying power to an individual customer. Line terminus 34 includes a power meter and load, and also includes a demand regulator device 35 described below. Each regulated customer will also have a control signal receiver. Receiving means 36 serves as a monitoring means for detecting control signals on branch 32 of power line 12.

A pair of tuned filter circuits 38 and 40, designated Filter A and Filter B, initially filter the power signal. Filters A and B are conventional tuned amplifiers with appropriate biasing circuitry such as the XR 2567 Tuned Amplifier Circuit, manufactured by Exar. The A Filter 38 is set to pass signals having a frequency of 18 KHz and the B Filter 40 is set to pass signals of 21 KHz.

Signals passed by the filters A and B are then secondarily filtered by demodulating circuits 42 and 44 forming second filter means. Demodulators 42 and 44 can be the same tuned amplifier circuits of Filters A and B with their peripheral biasing circuitry appropriately reset to pass signals having the modulation frequency of the two control signals. In the preferred embodiment shown in FIG. 1 the demodulators 42 and 44 are tuned to the modulation frequency of 60 Hz.

Signals passing through demodulator 42 are employed to operate solenoid 46 which is mechanically connected to a first switch means in demand regulator 35. In the embodiment of FIG. 1, a signal from demodulator 42 turns on transistor 50 which in turn energizes solenoid 46 causing a leftward movement of mechanical linkage 52 which connects to demand regulator 35. A signal passing through demodulator 44 similarly turns on transistor 54 which energizes solenoid 56 causing a rightward movement of mechanical linkage 52. The mode of the first switch means in regulator 35 is dependent on the control signal received. Linkage 52 remains in its last position until shifted to its other position by the appropriate solenoid. The function of solenoids 46 and 56 could alternatively be performed by a single two-way solenoid or similar device energized through appropriate circuitry by demodulators 42 and 44.

Figure 2:
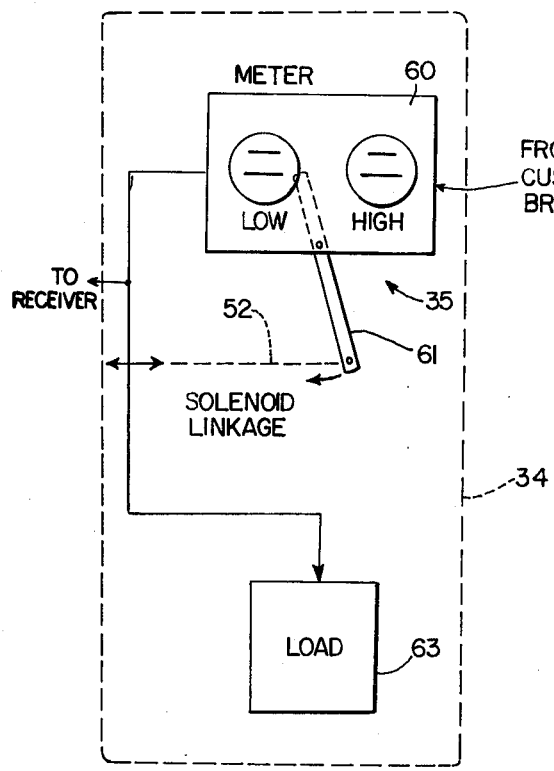
FIG. 2 is a schematic illustration of one embodiment of the customer branch line terminus in FIG. 1 taken in the direction of the lines 2—2 thereof.

Referring to FIG. 2, one embodiment of line terminus 34 includes a first switch means in the form of a mechanical switch arm on a two-rate meter. Power meter 60 is of a type having two separate counters for recording the amount of power supplied to the customer. The counter engaged at any given time and hence the metering rate is controlled by the position of linkage 52 acting through switch arm 61. Arm 61 is attached through appropriate linkages to a shiftable gear or the like which engages one of the two counters. Power is supplied to customer load 63 via the meter regardless of the position of arm 61. Arm 61 simply regulates which of the two counters is engaged to register the power supply. The actual construction of meter 60 is unimportant to this invention. Various forms of two-rate meters will occur to those skilled in the art, such as meters employing electronic counters or the like. Two separate meters could also be used. The meter shown in FIG. 2 is intended to be illustrative of a meter which permits control of the cost of the power supplied. The right position of arm 61 shown in FIG. 2 represents the low metering rate. If linkage 52 is shifted leftward by solenoid 46, meter 60 meters at the high metering rate. The appropriate rate is charged to the customer depending on the number of kilowatt-hours of electricity supplied at each rate.

Figure 3:
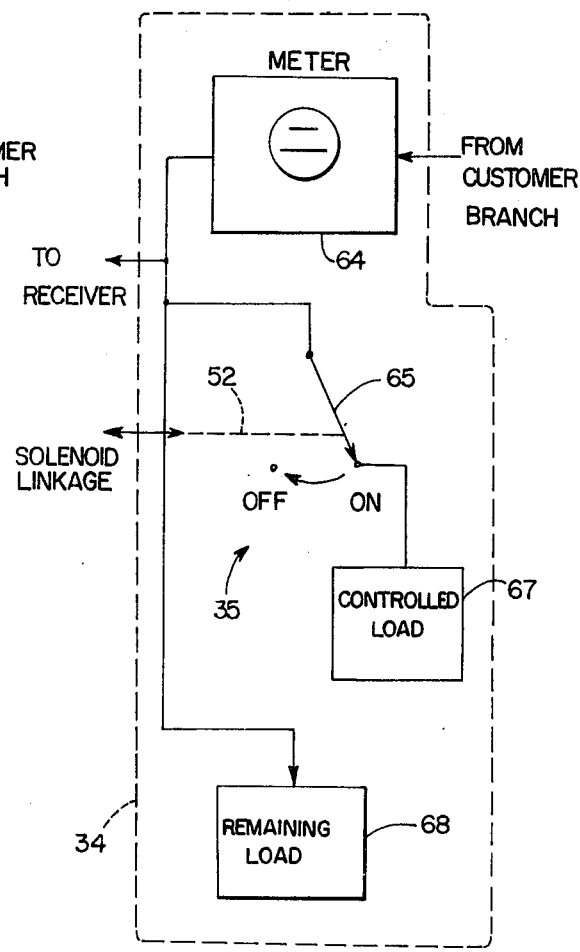
FIG. 3 is a schematic illustration of another embodiment of the line terminus in FIG. 2.

An alternative embodiment of line terminus 34 is shown in FIG. 3. In this embodiment power is supplied through a conventional single-rate meter 64. One or a plurality of the customer's circuits are designated as having controlled loads. Those circuits are then subject to direct control by the power company. The first switch means in the demand regulator 35 of this embodiment is power switch 65 operated by linkage 52. Switch 65 controls power to a specific power consuming device 67. If solenoid 46 is energized, switch 65 is moved leftward to its off position and the power to load 67 is cut off. Power is supplied to the remaining customer load 68 regardless of the position of linkage 52.

To briefly outline the method of operation, power demand is regulated by a first switch means in regulator 35 in the form of dual meter arm 61 switch 65. The switches have two modes, the first of which is most favorable to the customer and is shown in FIGS. 2 and 3. Transmitter 14 selectively introduces one of the two control signals onto power line 12. Receiver 36 forming the monitoring means filters the line signal to detect the presence of either control signal and in response operates the various switches to regulate demand.

Operation of the embodiments of the invention described above allows the power company to regulate power demand during peak demand periods. During times when the power supply is adequate the switching means in regulator 35 will be maintained in a first mode in which power consumption is encouraged. Switch arm 61 in FIG. 2 and switch 65 in FIG. 3 are both shown in their first modes. If power consumption begins to outrun supply, the power company will introduce selectively a control signal onto power line 12 by operating switch 24 to connect A Oscillator 18 to load modulator 25. An 18 KHz control signal modulated at 60 Hz will then be distributed to all customers served by power line 12. Although the range of control signals is not unlimited, it has been experimentally verified that a control signal will pass through the transformer, power-factor capacitors, and other installations normally found in a power supply network. The signal on the power line is continuously monitored by receiver 36 which detects a control signal having an 18 KHz signal frequency using A filter 38 and demodulator 42, causing actuation of solenoid 46. Linkage 52 is thereby shifted to the left which in the embodiment of FIG. 2 causes a shift of arm 61 and begins metering of power at the higher rate. The shift to higher-rate metering by the power company will preferably be on a previously announced schedule set to coincide with periods of high demand or will otherwise be made known to customers so that they may be encouraged to reduce power consumption. A light or other indicating means either on the meter or elsewhere could be used to let the customer know of the change to high metering rates, for example.

In the embodiment of FIG. 3 the selective introduction of a control signal by the power company to reduce demand will cause linkage 52 to shift switch 65 from its first mode to its second mode or "off" position. In the second mode, switch 65 de-energizes power consuming device 67, which is preferably a large load such as an air conditioner. This will cause a direct reduction in power demand. In this embodiment the entire receiving unit 36 and switch 65 could be housed in a portable box interconnected with the supply line to the controlled load. It could also be permanently installed in selected house circuits. Permission to install the load control device would be obtained by offering of lower electricity rates to the customer.

To restore low-rate metering or return power to the controlled load during periods of adequate supply, the power company will introduce selectively another control signal onto line 12. This is done by shifting switch 24 to connect 21 KHz B Oscillator 20 to load modulator 25. The control signal will pass through B filter 40 in receiver 36 and then through demodulator 44 to energize solenoid 56 moving linkage 52 to the right. That will restore arm 61 and switch 65 to the positions shown in FIGS. 2 and 3 respectively.

Because the first switch means in regulator 35 are stable in either mode the control signals need not be introduced continuously. It is anticipated that when a mode shift is desired the appropriate control signal will be selectively introduced to the power line for a period of about 30 seconds. Inadvertent shifts in mode can be rectified by repeating the last control signal. If, for example, demand was to be reduced for a period of 4 hours the appropriate control signal could be repeated every hour. To make the sytem fail-safe against overcharging customers the "low rate" control signal could likewise be repeated periodically. This could also be done in the event of a power interruption. The method of the invention calls for always sending a signal out to initially place the switch in regulator 35 in the first mode which is most favorable to the customer after an inadvertent power interruption.

Figure 4:
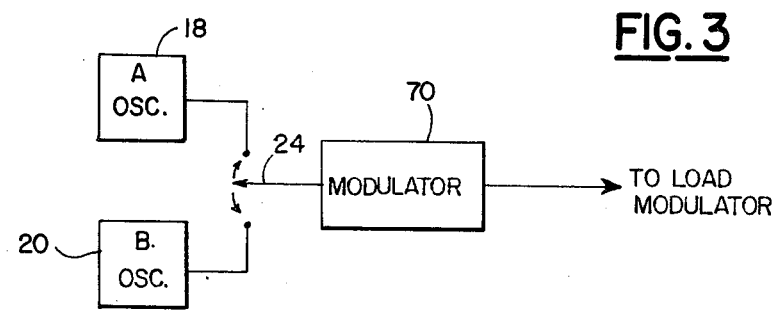
FIG. 4 is a schematic illustration of an alternative embodiment of a portion of the transmitter in FIG. 1 taken in the direction of the lines 4—4 thereof.

Another embodiment of the transmitter of the invention is shown in FIG. 4. In this embodiment, an additional signal modulation is added to the signal frequencies of the previous embodiment. As the output signal from each oscillator is selectively connected to load modulator 25 by means of switch 24 the signal passes through a means for additionally amplitude modulating the signal frequency. Modulator 70 is set to a low-frequency signal which is different from the 60 Hz line frequency, for example 84 Hz. The signal introduced onto the power line is modulated at 60 Hz as before providing a double modulated signal. In this embodiment the control signals having signal frequencies of 18 KHz and 21 KHz as modulated at 84 Hz are again detected by receiver 36. In this embodiment demodulators 42 and 44 are adjusted to pass 84 Hz rather than 60 Hz. It has been found that the presence of the additional 60 Hz modulation of the control signals does not significantly disrupt the ability of receiver 36 to detect and distinguish control signals.

Use of the transmitter of FIG. 4 with appropriate demodulators 42 and 44 increases noise rejection and helps to prevent inadvertent mode shifts. Noise on the line having a frequency in the range of the signal frequencies (18 KHz and 21 KHz) will more likely have a modulation frequency of 60 Hz than of 84 Hz. Control signals sent using modulator 70 are therefore more easily differentiated from line noise.

Figure 5:
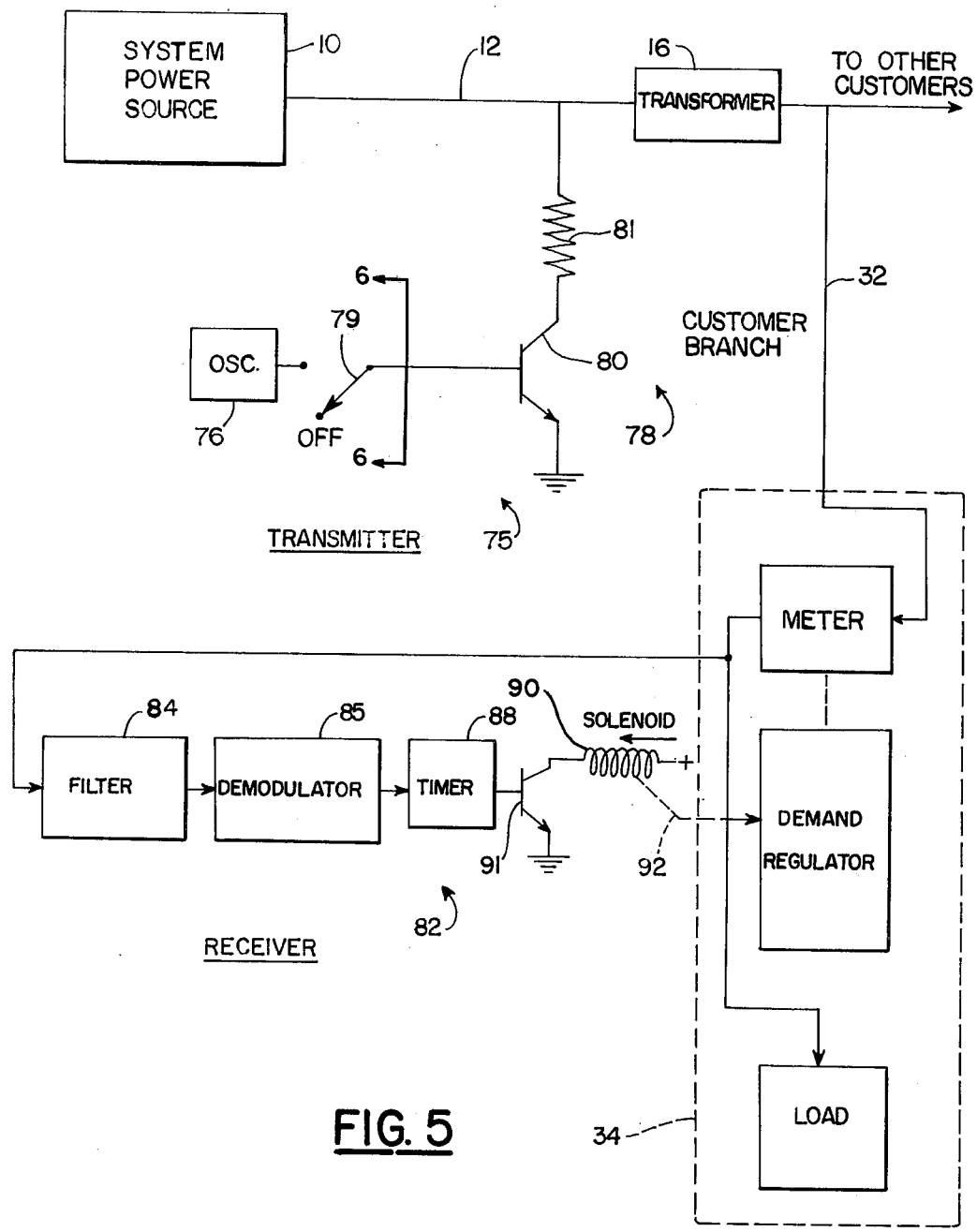
FIG. 5 is a schematic illustration of another embodiment of the load control system in FIG. 1.

This invention can also operate with only a single control signal frequency, as shown in the embodiment of FIG. 5. Power line 12 supplies individual customers through the same distribution feeder network as in the previous embodiment. The customer branch 32 serves a line terminus 34 equipped with a demand regulator 35. Transmitter 75 includes a single oscillator 76 and a load modulator 78. A switch 79 is used to selectively introduce the oscillating signal from oscillator 76 onto the power line through transistor 80 which periodically connects impedance 81 to the power line. Modulation of the signal frequency from oscillator 76 at 60 Hz is accomplished in the manner described above.

Receiver 82 of this embodiment includes a single tuned filter 84 and demodulator 85 which serve to detect control signals on customer branch 32 of the power line. The output of the demodulator 85 is used to signal timer 88. The timer is a conventional type providing a continuous output for a predetermined period of time after receiving an input pulse. Such a timer circuit is provided by a 555 Phase-Locked-Loop circuit manufactured by Signetics. When the output of timer 88 is positive, solenoid 90 is energized by way of transistor 91. Solenoid 90 is of a conventional type which has a rest position to which it returns after being energized. Linkage 92 connects solenoid 90 with demand regulator 35 which can be of the types shown in either FIGS. 2 or 3. Linkage 92 is equivalent in function to linkage 52 in FIGS. 2 and 3.

In this embodiment the method of the invention uses only a single control signal formed of a modulated oscillating signal. The embodiments of regulator switch means 35 begin at rest in a first mode as shown in FIGS. 2 and 3. When receiver 82 detects the control signal the switches (either arm 61 or switch 65) are shifted to a second mode. After a predetermined time set by timer 88 the switches are returned to the first mode.

In operation solenoid 90 assumes a rest position in which linkage 92 is positioned to the right. When in that position the operating switches assume the "low" positions most favorable to the customers, as shown in FIGS. 2 and 3. When the power company desires to reduce power demand a control signal is sent from transmitter 75 to receiver 82. The control signal passes through filter 84 and demodulator 85 and timer 88 is energized causing solenoid 90 to pull linkage 92 to the left, shifting the switch means in regulator 35 from a first to a second mode. Timer 88 continues to output a signal energizing solenoid 90 for a predetermined period of time. While solenoid 90 is energized demand regulator means 35 of FIG. 2 causes power to be metered at the higher rate and causes an interruption of power to controlled load 67 in FIG. 3. After the predetermined time interval set by timer 88 has expired, timer 88 returns the switch in regulator 35 to its first mode by stopping the output and de-energizing solenoid 90. This causes linkage 92 to return to its rest position in which power is metered at the low rate and the controlled load is again energized.

In this embodiment the signal frequency of the control signal generated by oscillator 76 is preferably 20 KHz. Timer 88 may be set to any convenient time interval such as one hour. If longer periods of power reduction are desired, repeated control signals can be sent by transmitter 75 to reset timer 88. The system is fail-safe in the event of inadvertent power interruption because timer 88 is cleared and solenoid 90 will automatically return to the mode most favorable to the customer.

Figure 6:
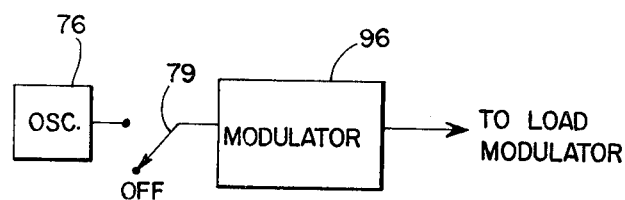
FIG. 6 is a schematic illustration of an alternative embodiment of a portion of the transmitter in FIG. 5 taken in the direction of the lines 6—6 thereof.

As in the previous embodiments, the embodiment of FIG. 5 can be made to include a second modulator as shown in FIG. 6. In this embodiment, oscillator 76 is coupled to load modulator 78 by way of modulating circuit 96, which is the same as modulating circuit 70 shown in FIG. 4. Again a modulation frequency of 84 Hz is suggested to which demodulator 85 is adjusted to correspond. As discussed above, this embodiment reduces the likelihood of inadvertent mode shifts due to line noise.

The signal frequencies of 18 KHz and 21 KHz in the embodiment of FIG. 1 and 20 KHz in the embodiment of FIG. 5 are intended to be approximate only and have been selected after empirical tests involving the transmission of various signal frequencies over an actual power distribution network. These frequencies may not be appropriate for all applications. A power distribution system is designed and constructed to transport large quantities of low frequency 60 Hz electrical energy. Problems arise when a high-frequency low-power signal is transmitted over such a system. These problems include the loss of signal through capacitance between distribution lines and ground, the presence of transformers and power factor capacitors, line noise, and the continuously varying load. Furthermore, each power distribution system is unique. Despite these problems, it has been experimentally determined that frequencies in the 20,000 Hz range are able to be transmitted a significant distance, such as several miles, and provide a usable signal at the customer loads. The frequencies selected are necessarily approximate and the optimum signal used should be determined independently for each application of this invention.

The invention described herein provides an inexpensive reliable means for remotely controlling customer power demand from a central point such as a substation. The receiving unit electronics are simple and inexpensive and, by the use of the fail-safe features described above, are reliable against overcharging customers.

While several embodiments of the invention have been shown and described, other changes are possible within the scope of the invention. Use of means other than a load modulator to introduce the control signal onto the power line is possible. A signal produced by an oscillator and then modulated could be directly injected onto the line. Other forms of demand regulation are also possible such as the automatic reduction in speed of non-essential motors, or the like.

An automatic load control system and method has been described providing means for remotely controlling customer power demand at a plurality of customer loads. The system and method uses active power lines to transmit the control signal to the customers and incorporates fail-safe features to prevent the inadvertent cutting off or overcharging of customers.

What is claimed is:

1. A signalling system for use with a power line transmitting power at a line frequency and having first switch means located at the customer load to regulate a function of customer power consumption: signalling means for introducing selectively at least one control signal onto the power line, said signalling means including oscillating means for producing at least one output signal of a given signal frequency and means for modulating the output signal to produce at least one control signal having a modulation frequency different from the signal frequency, receiving means including at least one tuned filter circuit having first filter means for passing the signal frequency produced by said oscillating means and a second filter means connected in series with said first filter means and tuned to said modulation frequency so that an output is present only when both the signal frequency and modulation frequency are present on the control signal, said receiving means being connected to said switch means at the customer load to thereby operate the same in response to control signals from said signalling means.

2. The signalling system of claim 1 which said first switch means controls power metering means which meters power supplied to the customer load at one of two metering rates dependent on the mode of said first switch means.

3. The signalling system of claim 1 in which said first switch means controls the power to a power consuming device whereby said power consuming device is energized when said first switch means is in a first mode and is de-energized when said first switch means is in a second mode.

4. The signalling system as in claim 1 in which said signalling means introduces selectively one of two control signals onto said power line, said signalling means including oscillating means for producing two signal frequencies with said modulating means modulating each said signal frequency at said modulation frequency to produce said two control signals, and in which said receiving means includes two tuned filter circuits each being tuned to one of said two signal frequencies whereby said receiving means operates said first switch means in rsponse to said two control signals from said signalling means to place said first switch means in one of two modes dependent on the control signal received.

5. The signalling system of claim 4 in which one said signal frequency is approximately 18 kilohertz and the other said signal frequency is approximately 21 kilohertz.

6. The signalling system of claim 1 in which said modulating means is a load modulator having second switch means for periodically connecting a load to the power line at the signal frequency of the control signal introduced by said signalling means.

7. The signalling system of claim 6 in which said modulating means includes means for additionally modulating said signal frequency thereby to introduce onto the power line a control signal having a modulation frequency which is different from said frequency.

8. The signalling system of claim 1 in which said receiving means shifts said first switch means from a first to a second mode in response to a control signal from said signalling means, said receiving means including timer means for returning said first switch means to said first mode a predetermined time after said receiving means receives said control signal.

9. The signalling system of claim 1 in which said signalling means includes oscillating means for producing a single signal frequency and said receiving means includes a single tuned filter circuit having first filter means which passes said single signal frequency.

10. A signalling system as in claim 9 in which said single signal frequency is approximately 20 kilohertz.

11. A signalling system for use with a power line transmitting power at a line frequency and having first switch means located at the customer load to regulate a function of customer power consumption comprising: oscillating means producing two signal frequencies, means for modulating said signal frequencies at a modulation frequency, second switch means, means for selectively operating said second switch means at one of said two signal frequencies thereby to apply one of the same to modulate the power line, receiving means including two tuned filter circuits each having first filter means for passing one of said two signal frequencies produced by said oscillating means and second filter means tuned to said modulation frequency, said receiving means being connected to said power line at the customer load to operate said first switch means whereby the mode of said first switch means is dependent upon the last signal frequency employed to modulate the power line.

12. The signalling system of claim 11 in which one said signal frequency is approximately 18 kilohertz and the other said signal frequency is approximately 21 kilohertz.

13. The signalling system of claim 11 in which said modulating means includes means for additionally modulating said signal frequencies at a modulation frequency which is different from said line frequency.

14. A method of regulating power demand in a system for distributing power at a fundamental line frequency including means for monitoring the signal carried by a power line transmitting power to the customer load and first switch means for regulating a factor of such power consumption, comprising the steps of: generating at least one oscillating signal having a predetermined signal frequency, modulating each said signal frequency generated at a modulation frequency to form at least one control signal resulting in double modulation, selectively introducing at least one said control signal onto said power line, causing said monitoring means to filter the signal on said power line to detect said at least one control signal introduced onto the power line, and operating said first switch means in response to control signals detected by said monitoring means to thereby regulate a factor in power consumption.

15. The method of claim 14 in which said monitoring means includes two tuned filter circuits, including the steps of: generating a second oscillating signal having a different predetermined signal frequency, modulating said second oscillating signal generated at a modulation frequency to form a second control signal resulting in double modulation, and in which filtering steps performed by said monitoring means include causing one said tuned filter circuit to detect one said control signal and place said first switch means in a first mode, and causing the other said tuned filter circuit to detect the other control signal and place said first switch means in a second mode, whereby the mode of said first switch means is controlled by the selective introduction of said control signals onto said power line.

16. The method of claim 15 in which said first switch means discourages power consumption when in said second mode including the step of initially placing said first switch means in a first mode which is most favorable to the customer after an inadvertent interruption of power supplied to the customer.

17. The method of claim 14 in which a single said control signal is selectively introduced onto said power line including the step of causing said monitoring means to shift said first switch means from a first to a second mode when said control signal is detected on said power line, and causing said first switch means to shift to said first mode a predetermined time after said monitoring means detects said control signal.

18. The method of claim 15 in which said filtering of said signal on said power line caused by said monitoring means includes the steps of initially passing only signals having frequencies equal to the predetermined signal frequency of each control signal formed, and then secondarily filtering the signals passed so as to secondarily pass only such signals as have a frequency equal to said modulation frequency.

* * * * *